(12) United States Patent
Liu

(10) Patent No.: US 8,019,746 B2
(45) Date of Patent: Sep. 13, 2011

(54) OPTIMIZED SEARCH RESULT COLUMNS ON SEARCH RESULTS PAGES

(75) Inventor: Weiguo Liu, Dublin, CA (US)

(73) Assignee: Yahoo! Inc., Sunnyvale, CA (US)

( * ) Notice: Subject to any disclaimer, the term of this patent is extended or adjusted under 35 U.S.C. 154(b) by 388 days.

(21) Appl. No.: 12/396,163

(22) Filed: Mar. 2, 2009

(65) Prior Publication Data

US 2010/0223546 A1 Sep. 2, 2010

(51) Int. Cl.
*G06F 17/30* (2006.01)

(52) U.S. Cl. ......... 707/707; 707/708; 707/726; 707/748

(58) Field of Classification Search .................. 707/706, 707/707, 708, 726, 748, 999.003
See application file for complete search history.

(56) References Cited

U.S. PATENT DOCUMENTS

| | | | |
|---|---|---|---|
| 7,593,928 B2 * | 9/2009 | Canon et al. ........................ 1/1 |
| 7,778,874 B1 * | 8/2010 | Saunders .................... 705/14.67 |
| 2005/0192946 A1 * | 9/2005 | Lu et al. ........................... 707/3 |
| 2006/0242553 A1 | 10/2006 | Kulas |
| 2007/0150353 A1 * | 6/2007 | Krassner et al. ................ 705/14 |
| 2007/0156654 A1 * | 7/2007 | Ravinarayanan ................. 707/3 |
| 2007/0192314 A1 * | 8/2007 | Heggem ............................. 707/5 |
| 2008/0183596 A1 * | 7/2008 | Nash et al. ....................... 705/27 |
| 2008/0235594 A1 * | 9/2008 | Bhumkar et al. ............. 715/738 |
| 2009/0077071 A1 * | 3/2009 | Mishkanian et al. ............. 707/5 |
| 2009/0254414 A1 * | 10/2009 | Schwarz et al. ................ 705/10 |
| 2010/0036730 A1 * | 2/2010 | Chan ........................... 705/14.51 |
| 2010/0106703 A1 * | 4/2010 | Cramer ........................ 707/706 |
| 2010/0161586 A1 * | 6/2010 | Safar ............................. 707/707 |
| 2010/0161605 A1 * | 6/2010 | Gabrilovich et al. ......... 707/736 |
| 2010/0250527 A1 * | 9/2010 | Gnanamani et al. .......... 707/726 |

OTHER PUBLICATIONS

Ghose et al. Comparing Performance Metrics in Organic Search with Sponsored Search Advertising, ACM. Aug. 24, 2008, pp. 18-26 (pp. 1 of 9).*
Google Web Search Help, "Features: More Sponsored Links," retrieved Jan. 14, 2009, from http://www.google.com/support/websearch/bin/answer.py?answer=99019&hl=en (1 page).
Guzel Magazine WordPress Theme, "Gabfire design tips Web design-development and WordPress news," retrieved Jan. 5, 2009, from http://www.gabfire.com/guzel-magazine-wordpress-theme/ (12 pages).
Searchnews, "Ad Words Sponsored Links Get A Facelift!" retrieved Jan. 5, 2009, from http://www.searchnewz.com/latestsearch/senews/sn-4-20080730AdWordsSponsoredLinksGetaFacelift (2 pages).
Cuil.com web site, retrieved Mar. 11, 2009, from http://www.cuil.com/search?q=Barbie, 1 page (2009).
Fried, Ina, "First screenshot of Microsoft's Kumo," *Beyond Binary*, retrieved Mar. 11, 2009, from http://news.cnet.com/8301-13860_3-10186108-56.html, 5 pages (Mar. 2, 2009).

(Continued)

*Primary Examiner* — Debbie Le
(74) *Attorney, Agent, or Firm* — Nathan O. Greene; Brinks Hofer Gilson & Lione

(57) ABSTRACT

Computer-implemented system and methods are disclosed for optimizing the relative positions of sponsored and organic search results on a search results page displayed to a user, including calculating, by a search engine, a degree of commerciality of a search query; receiving the search query from a user by the search engine; and delivering, by the search engine to a browser of a user, a plurality of sponsored search results in at least two columns and a plurality of organic search results in at least a third column of one or more search results pages, wherein a layout of the at least three columns depends on the degree of commerciality of the search query.

24 Claims, 7 Drawing Sheets

OTHER PUBLICATIONS

Swisher, Kara, "A Sneak Peek Look at Microsoft's New Kumo: A Spidery Cloud? A Cloudy Spider?" *All things Digital*, retrieved Mar. 11, 2009, from http://kara.allthingsd.com/?p-10555&ak_action=printable, 3 pages (Mar. 2, 2009).

Visual Search—Searchme.com, retrieved Mar. 16, 2009, from http://www.searchme.com/, 1 page (2009).

* cited by examiner

OPTIMIZED SEARCH RESULT COLUMNS ON SEARCH RESULTS PAGES

BACKGROUND

1. Technical Field

The disclosed embodiments relate to the display of both sponsored and organic search results on a search results page, and more particularly, to optimizing delivery of the sponsored search results in additional columns of varying location depending on a level of commerciality of a search query.

2. Related Art

Today, all three major internet search engines—Yahoo! of Sunnyvale, Calif., Google of Mountain View, Calif., and Microsoft of Redmond, Wash.—have the same general layout for search results pages. They all use two text columns: one wide column at the left (or west) to list the algorithmic (or organic) search results and one narrow column at the right (or east) to list the sponsored search results, if any. This layout started from the early age of the search engine in the 1990's when computers had small screens due to cathode ray tube (CRT) technology. On a wide screen as displayed on monitors with current flat screen technology, this layout leaves a lot of space between the two columns and looks outdated.

Many search terms or queries submitted to search engines today are commercial in nature in that the searcher seeks a purchasing opportunity, whether a good or service, or to purchase information. For commercial search terms, with today's two-column results pages, search engines are not able to display more sponsored links in the first page of search results, which is the most important page because it is the page from which the majority of click traffic is derived. Usually the right column displays, at the most, eight sponsored results, and users need to click to the next page to find more results, which they rarely do. Moreover, for these search terms, because of the success of search engine optimization (SEO) employed by commercial companies, the organic results in the first pages are largely commercial and often duplicate the sponsored search results on the first page. Search engine optimization (SEO) is the process of improving the volume and quality of traffic to a web site from search engines via natural ("organic" or "algorithmic") search results. Because the organic results are in the more noticeable left column, users are likely to click on them and land on the same commercial pages as they would have had they clicked on a corresponding sponsored search result, but without paying sufficient attention to the sponsored right column. In this way, search engines lose revenue opportunities if they are paid per click (PPC) on each sponsored search result, as will be explained in more detail below.

Yahoo! Dude and the similar Google and MSN products are trying to solve the problem by placing a few, often two to four, sponsored advertisements ("ads") in north advertisement positions, which are positions located at the top of the search results page above the organic search results. Because north advertisements push the organic results down, however, searchers need to scroll down to see the organic search results. Forcing searchers to scroll down to see organic search results is in contravention of their interests, which include quickly finding relevant, organic listings. Therefore, all three major search engines limit the usage of advertising in north positions and develop complex algorithms to dynamically adjust the number of north advertisements in order to balance user interests with revenue opportunities. Although this balance is attempted, it is imperfect. In the two-column layout discussed above, the search engine provider will need to use north advertising space to increase revenue even if it is known to hurt user satisfaction to some degree. For search terms that are commercial, search engines are unable to display more sponsored links on the first page with the traditional two-column format.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION

Figure 1:
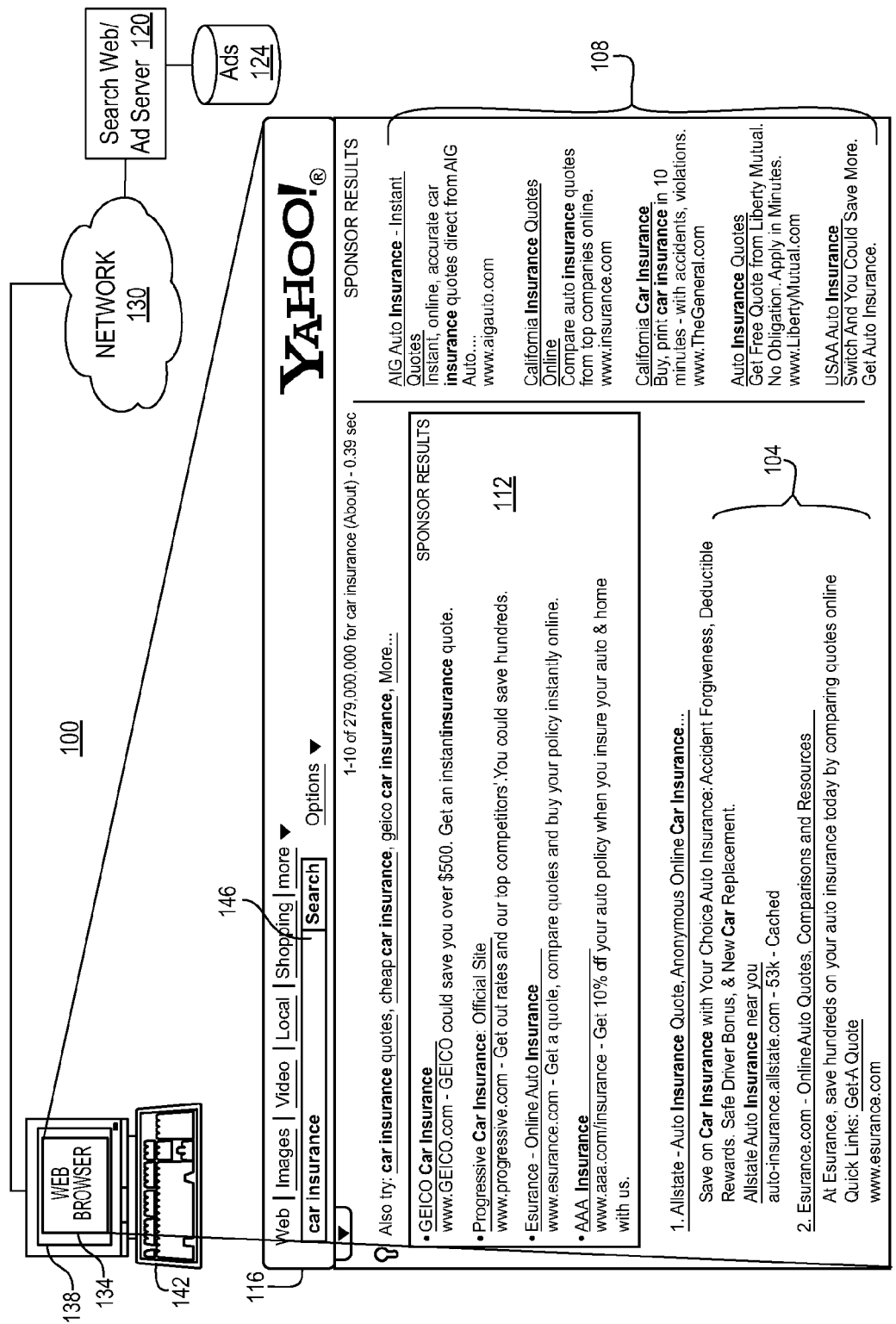
FIG. 1 is a block diagram of an exemplary prior art system that delivers advertisements in a two-column format that includes organic search results on the left (west) and sponsored search results in positions on the right (east) and in the north.

By way of introduction, included below is a system and methods for display of both sponsored and organic search results on a search results page. More particularly, the system and methods relate to optimizing delivery of the sponsored search results in additional columns in varying relative positions with respect to the organic search results depending on a level of commerciality of a search query. As discussed above, advertisers may use search engine optimization (SEO) techniques to improve the ranking of their listings within organic (or non-paid) search results, and thus avoid the need to bid on and pay for top-listed sponsored search results. Additionally, to maximize the user experience in searching, the sponsored north advertisement positions may be excluded from the search results page to allow the same number of organic search results to be seen at a first glance. The overall number of sponsored advertisements on the first page, however, may still be increased by adding at least an additional column of sponsored advertisements. With today's wide screen technology, monitor screens provide ample room for additional columns of search results. The decision of whether to add one or more columns in addition to the normal one column of sponsored advertisements may be made at least based on a level of commerciality of the terms of the search query.

When the layout of a search results page depends on search term characteristics, a correct method of categorization should be employed to determine if the search term should be considered commercial. For instance, to determine if a term is commercial, one popular algorithm is to use the click ratio of a number of clicks on the sponsored search results compared to a number of clicks on the organic search results. When the first few organic results are determined to be commercial or are linked to the same pages as are the sponsored search results, this method may not work very well because the organic search results may also be as commercial as the sponsored search results. A simpler method that depends directly on various aspects of the search market, as described below, may produce better results. In one embodiment, the number of advertisers bidding on the search term(s) of the search query and the total amount they collectively bid on those term(s) should be good indicators of whether the query is commercial. When advertisers are referred to in their roles as bidders, they will be referred to as "bidders."

The most popular pricing model for search engine marketing is the pay-per-click (PPC) model. Under this model, the advertiser pays the search engine a certain amount only when a searcher has clicked on an advertisement (ad) or sponsored link of the advertiser and landed on a (landing) page associated with the ad or sponsored link. The search engine is not paid if the searcher leaves the results page without clicking or clicks on an organic link, no matter where the organic link subsequently lands. Other pricing models exist, including pay-per-impression, where an advertiser pays every time their ad is displayed, and pay-per-action (PPA), where advertisers only pay if the ad results in a sale or other action.

In the PPC pricing model, the amount paid by an advertiser for each click is typically determined by an auction process. Advertisers place bids on a search phrase, and the position of their ad on the search results page is associated with their own bid in relation the bids of other advertisers. Each sponsored search ad has one or more bid phrases associated with it. In addition to bid phrases, advertisements also have a title as a hypertext link, usually displayed in bold font, and an abstract or creative, which includes a few lines of text—usually shorter than 120 characters—displayed on the page. Each ad also contains a uniform resource locator (URL) to the advertised web page, which is called the landing page.

Each advertiser also submits a daily maximum spend amount. Accordingly, a search engine needs to estimate how many clicks will be obtained over a period of time for each advertiser in their respective sponsored positions on the search results pages. This estimation is based on historical click data, including average click-through-rates (CTR) at the position of each advertiser. Positions may be rotated among more than one advertiser, as needed, to reach that maximum daily spend amount as precisely as possible for each advertiser.

A search query is any text a user has typed into a search box of a search engine. In this context, sometimes "search query" can refer to a phrase that matches one or more sponsored bids. A search query does not need to be the exact phrase for which an advertiser bid. For example, an advertiser may bid on the phrase 'tennis shoes' using a broad match option where queries are matched against ads using a broader criterion. A broad match bid could result in delivering of the sponsored ad to many relevant search queries that may not contain the exact bid phrase. In this example, the advertiser's ad may appear in "matched" search queries such as 'sport shoe,' 'tennis sneakers,' 'running shoes,' and so on.

FIG. 1 is a block diagram of an exemplary prior art system 100 that delivers advertisements in a two-column format that includes organic search results 104 on the left (west) and optional sponsored search results 108, 112 in positions on the right (east) and in the north, respectively, of a search results page 116. Accordingly, commercial search engines have historically listed on the left-hand column first the north sponsored search results 112 followed by the organic search results 104, and in the right-hand column, the sponsored search results 108. The organic search results 104 and the sponsored search results 108, 112 are delivered by a search web/ad server 120, variably referred to herein as a search engine 120, to the search results page 116. The positions of sponsored search results 108 are variably referred to by their cardinal locations, north, east, and south. These locations respectively refer to the top, right, and bottom of the search results page 116.

The sponsored advertisements 104, 108, 112 may be indexed and stored in an ad database 124 of the search engine 120, and delivered over a network 130 such as the Internet, the World Wide Web ("Web"), a local area network (LAN), a wide area network (WAN), or other network. The web search page 116 may be displayed on a web browser 134 of a monitor 138 (or other display device) of a computing or communication device 142 such as a personal computer. The computing or communication device 142 may be a computer, a personal digital assistant ("PDA"), a smart phone such as the Blackberry by Research in Motion (RIM), a mobile internet phone or device, a laptop, etc. The search query submitted by the user in a search box 146 of the search results page 112 embodies the user's intent, and is the main trigger for selecting ads to display from the ad database 124, which are then listed as sponsored advertisements 108 (east), 112 (north). Additionally, ads may be delivered based on user search behavior, or based on an analysis of the organic search results 104.

Figure 2:
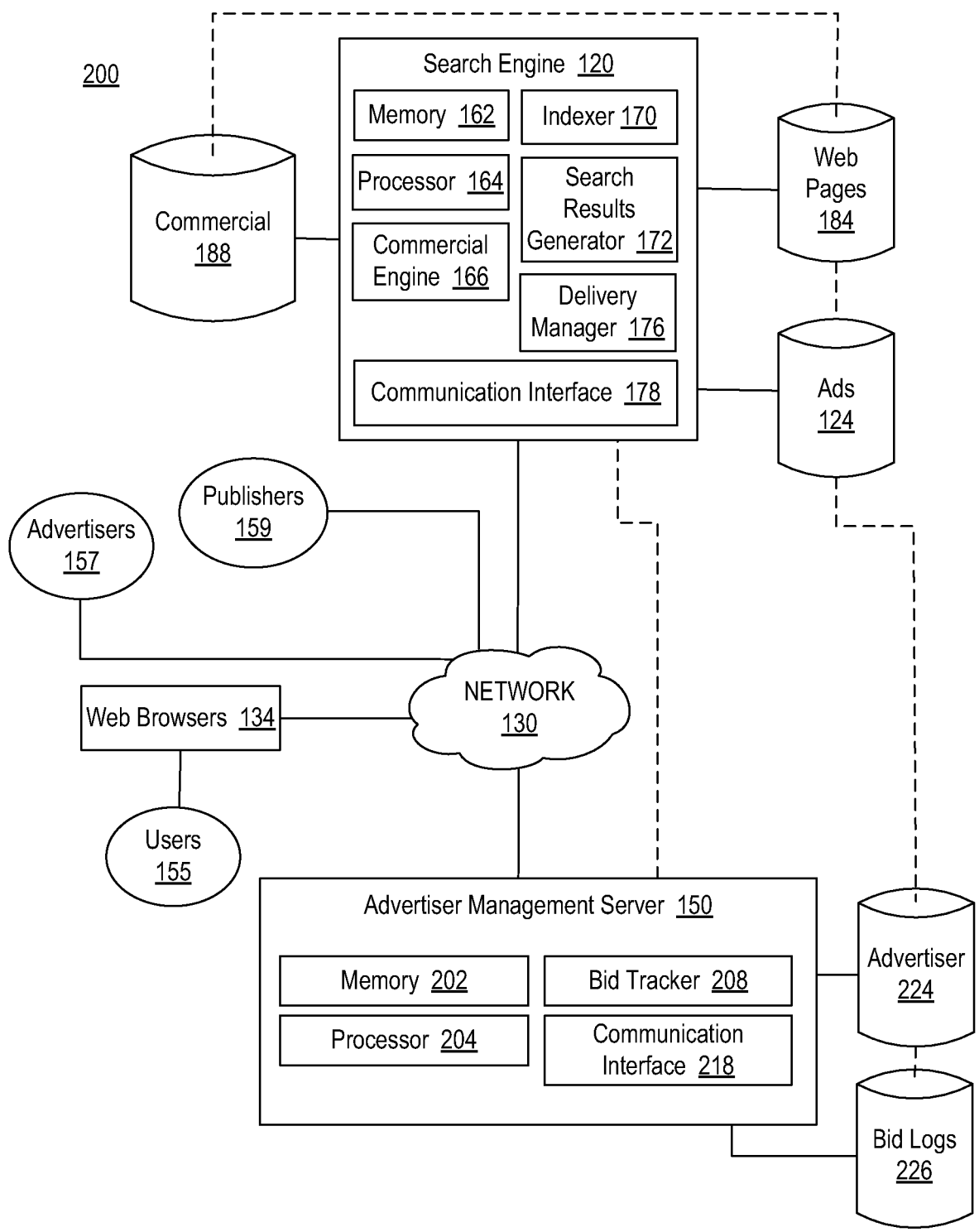
FIG. 2 is a block diagram of an exemplary network system for optimizing delivery of sponsored search results, alongside organic results, in additional columns depending on a level of commerciality of a search query.

FIG. 2 provides a view of a network system in which the present system and methods may be implemented. Not all of the depicted components may be required, however, and some systems may include additional, different, or fewer components not shown in FIG. 2 may be provided. Variations in the arrangement and type of the components may be made without departing from the spirit or scope of the claims as set forth herein.

FIG. 2 is a block diagram of an exemplary network system 200 for optimizing delivery of sponsored search results 104, alongside organic results 108, in additional columns depending on a level of commerciality of a search query. Some of the components of the system 100 introduced above may exist within this exemplary system 200. In particular, the system 200 includes the search engine 120 and an advertiser management server 150 as well as a plurality of users 155, advertisers (or bidders) 157, and publishers 159 that all communicate over the network 130 or internet. The users 155 communicate through the web browsers 134 on computing devices 142, such as those discussed above.

The search engine 120 may include a memory 162, a processor 164, a commercial engine 166, an indexer 170, a search results generator 172, a delivery manager 176, and a communication interface 178. Additionally, the search engine 120 includes the ad database 124, a web pages database 184, and a commercial database 188. All of these components may be coupled with each other. Herein, the phrase "coupled with" is defined to mean directly connected to or indirectly connected through one or more intermediate components. Such intermediate components may include both hardware and software based components. The advertiser management server 150 may include a memory 202, a processor 204, a bid tracker 208, and a communication interface 218. The advertiser management server 150 may also include an advertiser database 224 and a bid logs database 226. All of these components may be coupled with each other. Likewise, the search engine 120 and the advertiser management server 150 may be coupled with each other over the network. Various databases described herein may also be coupled with each other and provide for a distributed data processing system and storage system.

The advertiser management server 150 interacts with the advertisers 157 over the network 130 by creating and managing advertiser accounts, information for which may be stored in the advertiser database 224. As advertisers 157 competitively bid against each other in the market of advertising search terms (also referred to as keywords), the bid tracker 208 tracks the number of advertisers 157 that bid on particular search terms and amounts of their bids. This information may be stored in the bid logs database 226, which may be accessed and/or stored by the search engine 120 for use by the commercial engine 166 in determining a degree of commerciality of search queries, which is discussed below. The communication interface 218 may communicate over the network 130 with the communication interface 178 of the search engine 120 and with the advertisers 157 or other entities being managed by the advertiser management server 150.

The web pages stored in the web pages database 184 may include landing pages associated with various advertisement listings stored in the ad database 124, both of which may be stored in relation to each other in a single database. The search engine 120 receives a search query from a user 155 through the communication interface 178. The processor 164 in conjunction with the search results generator 172 locates the most relevant web pages (organic listings 104) and advertisements (sponsored ads 108, 112) to return to the search results page 116 in response to search query, as displayed in FIG. 1.

The commercial engine 166 may calculate the degree to which the search query is commercial based on various factors and analysis. For instance, the commercial engine 166 may determine a number of advertisers 157 that bid on terms of the search query and a total bid amount by the advertisers 157 on the search query. This analysis may include terms in the search query that broadly match a related term bid on by an advertiser where the advertiser requests broad match. Data needed to determine the number of advertisers and total bid amount on the search terms may be retrieved from the advertiser and/or bid logs databases 224, 226 of the advertiser management server 150.

The search engine 120 needs to determine the number of sponsored positions that have been purchased for every search term. From the point of view of a search user 155, each sponsored position corresponds to a bidder. But, to the search engine 120, the total number of purchased positions may not equal to the number of bidders. Often a bidder only purchases a fraction of a sponsored position. The commercial engine 166 may employ various algorithms, therefore, to determine the number of bidders bidding on a search term.

For example, assume a term receives one million searches in an average day. A bidder bids $0.50 per click with the maximum daily spend amount budgeted at $300. If the bidder gets an average 0.3% click-through rate (CTR) at a certain position, the bidder can expect 3 clicks for every 1000 searches. The number of searches to max out the daily spending is (300/0.5)/0.003 =200,000. Therefore, the bidder only purchased a fifth (⅕) of the position. In actuality, the CTR depends on the position the link appears in the page, and the bidder may also specify the time of the day and the geographic coverage of an advertisement 108. Therefore, the actual computation of the total number of purchased positions is more complex than straight-forward addition; but, using the historical and current bidding data, the commercial engine 166 may make a good estimation of the total number of purchased positions. This analysis, to some degree, estimates the commerciality of the search term because a highly commercial search term will require more positions in the sponsored search results 108 based on higher advertiser demand to turn a profit based on exposure in those positions.

The commercial engine 166 may also determine a ratio of commercial organic search results to total organic search results 104 returned in response to the search query to determine a commercial score of the search query, which also estimates a level of commerciality. A degree of commerciality of an organic search result 104 may be determined through analysis of its landing page for commercially-related content. Such content may include offers for sale, promotional language, a shopping cart or means of purchasing or requesting for purchase goods or services advertised on the landing page.

With a popular search engine 120 such as Yahoo! or Google, a commercial site usually also bids on search terms in addition to SEO efforts, and thus creates sponsored search results 108. In such a case, it may be sufficient to consider each organic search result 104 from advertisers 157 that also own positions in the sponsored search results 108. This analysis may be broadened to include advertisers 157 that are also bidding on search terms related to the current search query. Again, this data may be obtained from the advertiser and/or bid logs databases 224, 226. Otherwise, the landing page or the landing site may be examined to determine if it is commercial as discussed above. The commercial engine 166 need only examine the organic search results 104 in the first one or two resulting pages of a search query to make a commerciality estimate, and do so for the terms that have a high number of bidders. A commercial score may then be assigned the search query based on how many of the organic search results are considered "commercial." The commercial score may be returned as a percentage of the organic search results analyzed that are considered commercial.

From the total number of purchased positions for a search term, the search engine 120 may determine how many columns of sponsored search results 108 need to be displayed because most search engines 120 adopt the convention of displaying a fixed number of eight sponsored search results per column, each with a hyperlink to a landing page. From the commerciality of the search query—based both on a number of required sponsored search result positions and a percentage of organic search results that are commercial—the search engine 120 may determine if two left sponsored columns is the best suitable. For example, one strategy is to use two left columns of sponsored search results (FIG. 3B) when a term has more than twelve (12) purchased positions and the commercial rate (or score) of the first page or two of the search results page 116 is greater than a certain level, say 50%. This will be discussed in additional detail with respect to FIG. 3B.

In another embodiment the rule can be changed to include inspection of a greater number of bidding metrics and any combination of functions on these metrics. For instance, if the number of daily searchers is greater or equal to 1,000; the number of bidders is greater than or equal to 15; the average bid PPC is greater than $0.68; the total maximum daily spend amount for the advertisers is greater than $1,000; and the commercial score is greater than 50%, then the search engine 120 uses two left columns of sponsored search results as in FIG. 3B. Otherwise, if the number of daily searchers is less than 100; a number of bidders is less than four (4); or if the commercial score is less than about 20%, then the search engine 120 uses two right columns of sponsored search results, as in FIG. 3C. Any number of criteria may be used as rules for determining an appropriate layout, and such criteria may be revised over time.

The commercial engine 166 may determine the degree of commerciality of search query terms offline, and such calculations may be updated frequently. For example, the calculations may be updated every day or every one or more hours, to reflect the bid changes of the sponsored results 108 and the page rank changes of the organic search results 104. The commercial engine 166 may also store the commercial score—or some other metric—for each bid phrase in the commercial database 188 for later online retrieval upon receipt of matching search queries. A search query having multiple terms may have a commercial score already calculated and available in the commercial database 188, or the commercial engine 166 may choose to, in real time, calculate an average score for the various terms of a search query phrase, where the commercial scores of the various terms have already been calculated.

The delivery manager 176 may receive the search query from the communication interface 178 and demand that the communication interface 178 deliver a plurality of sponsored search results 108 and organic search results 104 to the browser 134 of a user 155 in response to the search query. Part of this delivery demand may cause the search results page 116 to be formatted with at least two (or more) columns of sponsored search results 108 if the search query has a commercial score (or commercial level) within a threshold level of commerciality. That is to say, if the degree of commerciality of the search query is above a threshold level, which may be arbitrarily set for all search queries or may be dynamically set for different types of subject matter of the search query, then the search query is considered to be sufficiently commercial for delivery of additional sponsored search listings 108. One way to deliver additional sponsored search results 108 is to create an additional (narrow) column on the search results page 116 containing more sponsored search results 108. FIGS. 3A, 3B, 3C, and 3D display and explain various possible formats compatible with wider screen displays, some of which may be preferred over another depending on the level of commerciality calculated by the commercial engine 166 for any given search query.

Figure 3A:
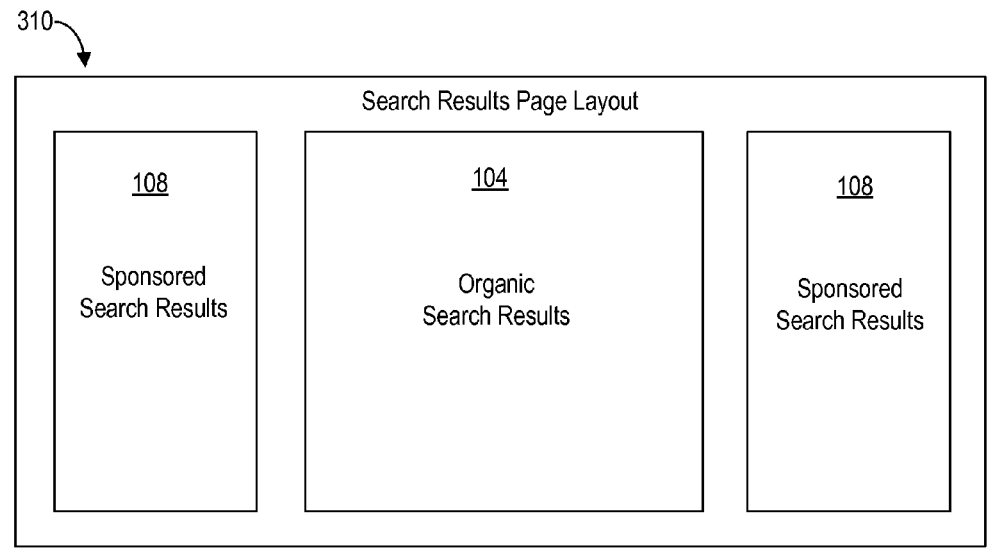
FIG. 3A is a diagram of an exemplary search results page layout including two columns of sponsored search results.

FIG. 3A is a diagram of an exemplary search results page layout 310 including two columns of sponsored search results. Note that two columns of sponsored search results 108 have been delivered to the search results page 116, one to the left and another to the right of the organic search results 104. This layout 310 may be used as the default three-column layout. Having two columns on the sponsored search results page 116 potentially doubles the number of sponsored search results 108 on the first page. When compared with two to four north ads, the number of sponsored links in two columns is still considerably more. Accordingly, interests of the users 155 in quickly finding relevant search results are considered, and the organic search results 104 are readily available, being listed from the top of the search results page 116.

The page layout can be changeable. As shown in FIG. 3A, the sponsored search results 108 columns need not always be served on the right as shown in FIG. 1. Different arrangements of three or more columns may be employed. From the point of view of the search engine 120, the search results page 116 should be optimized for the best user experience. The most eye-catching positions should be filled with listings that are most likely to be clicked. For optimization purposes, it makes sense to dynamically, or upon receipt of a search query, determine the page layout that best responds to the search query.

The narrow-wide-narrow page layout 310 of FIG. 3A is one example, wherein the organic search results 104 are in the middle, wider column. The narrow left column may be used as the primary column of sponsored search results 108, meaning that this column will be filled in first, followed by the right narrow column, which is secondary. For terms that are bid on heavily by the advertisers 157, both narrow columns are used for listing the sponsored search results 108. For search queries that have fewer bidders, the right column can be used for other purposes. For example, the right column may display graphic advertisements, link back to the search engine provider's other content, or link to any other network or affiliate content. Most effectively, these additional search results may contain links that are not necessarily sponsored search results 108 in the right column, but will be relevant to the search query.

Figure 3B:
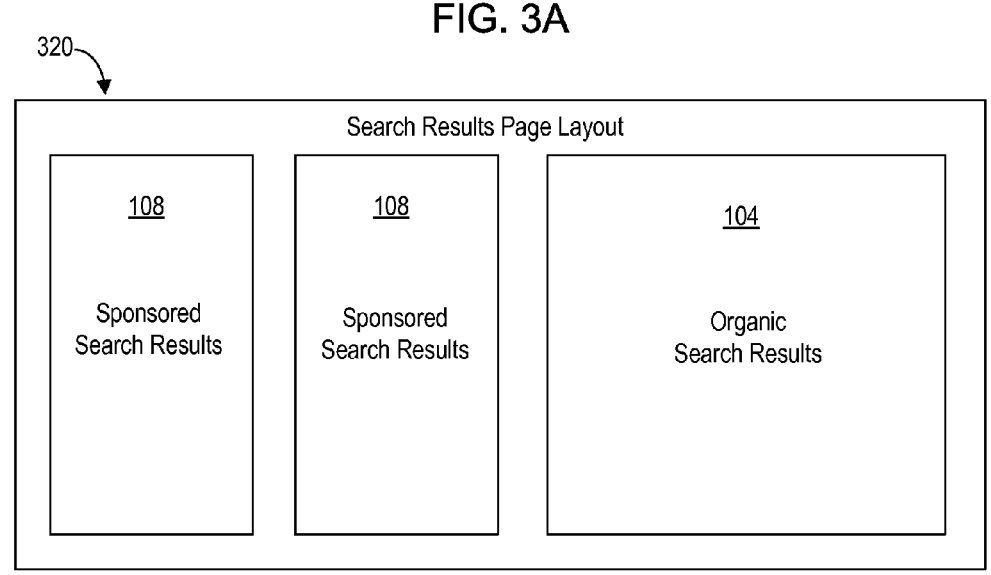
FIG. 3B is a diagram of another exemplary search results page layout including two columns of sponsored search results.

FIG. 3B is a diagram of another exemplary search results page layout 320 including two columns of sponsored search results. In this embodiment, the sponsored search results 108 are all displayed in two left columns that are positioned adjacent one another. For commercial search terms having high levels of commerciality, this search results page layout 320 is perhaps the best because searchers 155 are most likely to be searching for commercial results and just as likely—and happy—to click on sponsored search results 108 as the organic search results 104. For some of these terms, many organic links 104 have corresponding sponsored search results 108, so the searcher 155 is just as satisfied to click on the latter, which will also generate revenue for the search engine provider.

As discussed above, one strategy for determining a threshold level of commerciality to justify using two left columns, as displayed in FIG. 3B, is to determine when a search query has more than twelve (12) purchased positions and the commercial rate (or score) of the first page of the search results page 116 is greater than 50%. So, if the search query includes commercial search terms having a high commerciality, the first page could easily fill all sixteen (16) positions, eight for each column as viewable on the first page. The commercial engine 166 may also pull commercial scores affiliated with the landing page or landing site of the sponsored search results 108, and average them together to come up with a final commercial rate. If there are more than twelve (12) purchased positions and they together have a commercial rate of 50% or higher, then the two left columns may be employed. Other embodiments of different rules were discussed above; accordingly, the numbers used in the examples disclosed herein should be regarded as exemplary. Only the search engine provider can determine the best values for its practice, which may vary depending on dynamics of the sponsored search and organics search results markets for that search engine provider.

Figure 3C:
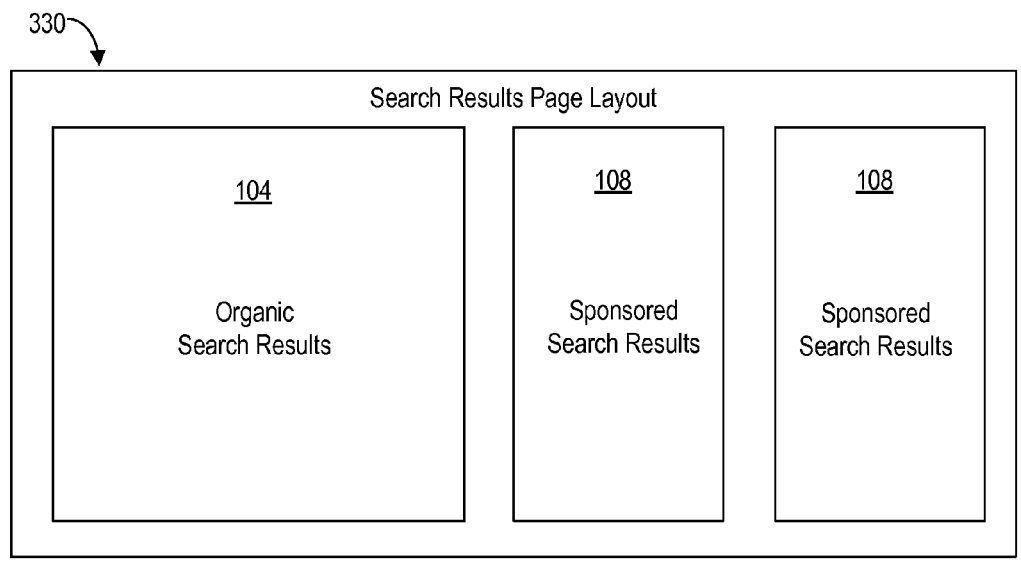
FIG. 3C is a diagram of yet another exemplary search results page layout including two columns of sponsored search results.

FIG. 3C is a diagram of yet another exemplary search results page layout 330 including two columns of sponsored search results. In this embodiment, the two columns of sponsored search results 108 are displayed to the right of the organic search results 104. This embodiment is most like the two-column layout displayed in FIG. 1, except that there are two columns of sponsored search results 108, which still may have the same advantages discussed above, although not being displayed in the most eye-catching locations. Accordingly, the search results page layout 330 of FIG. 3C may be employed for lower commercial scores, wherein the most eye-catching positions remain organic search results 104, but interests of the search engine provider are still sought by serving additional possible sponsored search results 108 to the results page 116. As discussed above, certain metrics can be accessed as criteria for use of FIG. 3C. For instance, if the number of daily searchers for a search query is less than 100, the number of bidders is less than four, or the commercial score is less than about 20%, the commerciality of the search query is sufficiently low for use of FIG. 3C as the layout of sponsored search results.

Figure 3D:
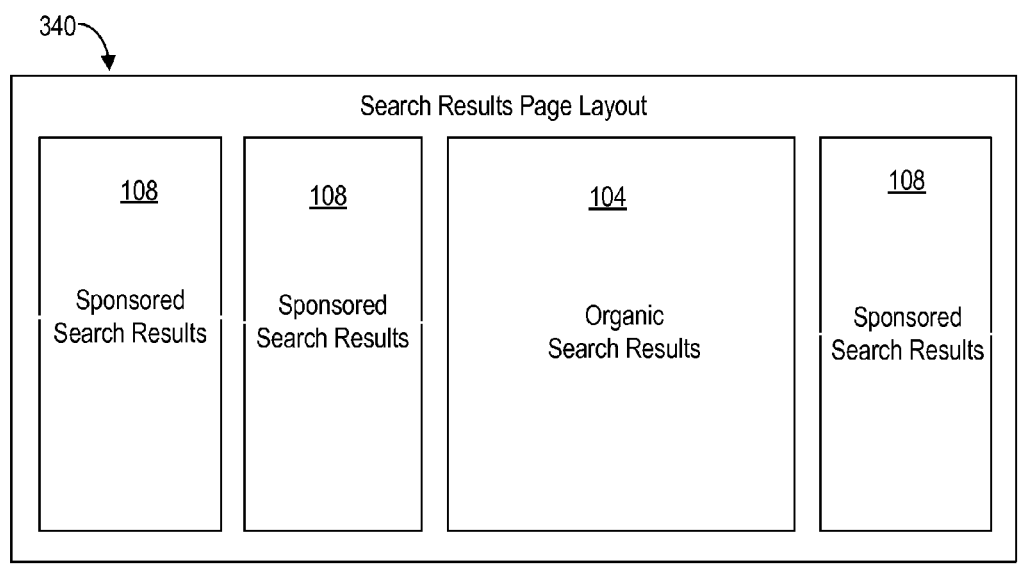
FIG. 3D is a diagram of an exemplary search results page layout including three columns of sponsored search results.

FIG. 3D is a diagram of an exemplary search results page layout 340 including three columns of sponsored search results 108. In this embodiment, note that there are now a total of three columns of sponsored search results 108, two of which are to the left of the organic search results 104 and one of which is in the previously-normal right position. Accordingly, the embodiments herein need not be constrained to a three-column format and may include four or more columns with growing numbers of sponsored search results 108 as average display size increases with larger monitors. As discussed with respect to FIG. 3A, one or more columns of the four-column page layout 340 may include graphical advertisement or affiliate links or informational advertisements that are not necessarily paid search results, but which are hopefully relevant to the search query.

Any of the above-disclosed page layouts should still respect the current search habits of the users 155 and comply with existing regulations to clearly mark sponsored search results 108 as "Sponsored Results." The search engine may also choose to paint the background of the sponsored search results 108 in a different color or shade of color to ensure it is clear that the user 155 is clicking on a sponsored result 108.

The purpose of generating and delivering a new search results page layout (310, 320, 330, or 340) is to optimize the user search experience and to also optimize the marketing efficiency for the search engine provider. For commercial search terms having high levels of commerciality, e.g., high commercial scores, it is proper to put sponsored results 108 in the most eye-catching positions. The three-column arrangement uses the space more effectively. Unlike using north advertising, it shows no fewer organic results within the first glance of a user 155. Therefore, the three-column arrangement interferes less with user search experiences. The cost for rearranging columns should be minor. Similar to making a proper shelf display in a retail store, however, the effect should be quickly noticeable to searching users 155, and therefore, have a positive result in terms of increasing click traffic to sponsored search results 108.

Figure 4:
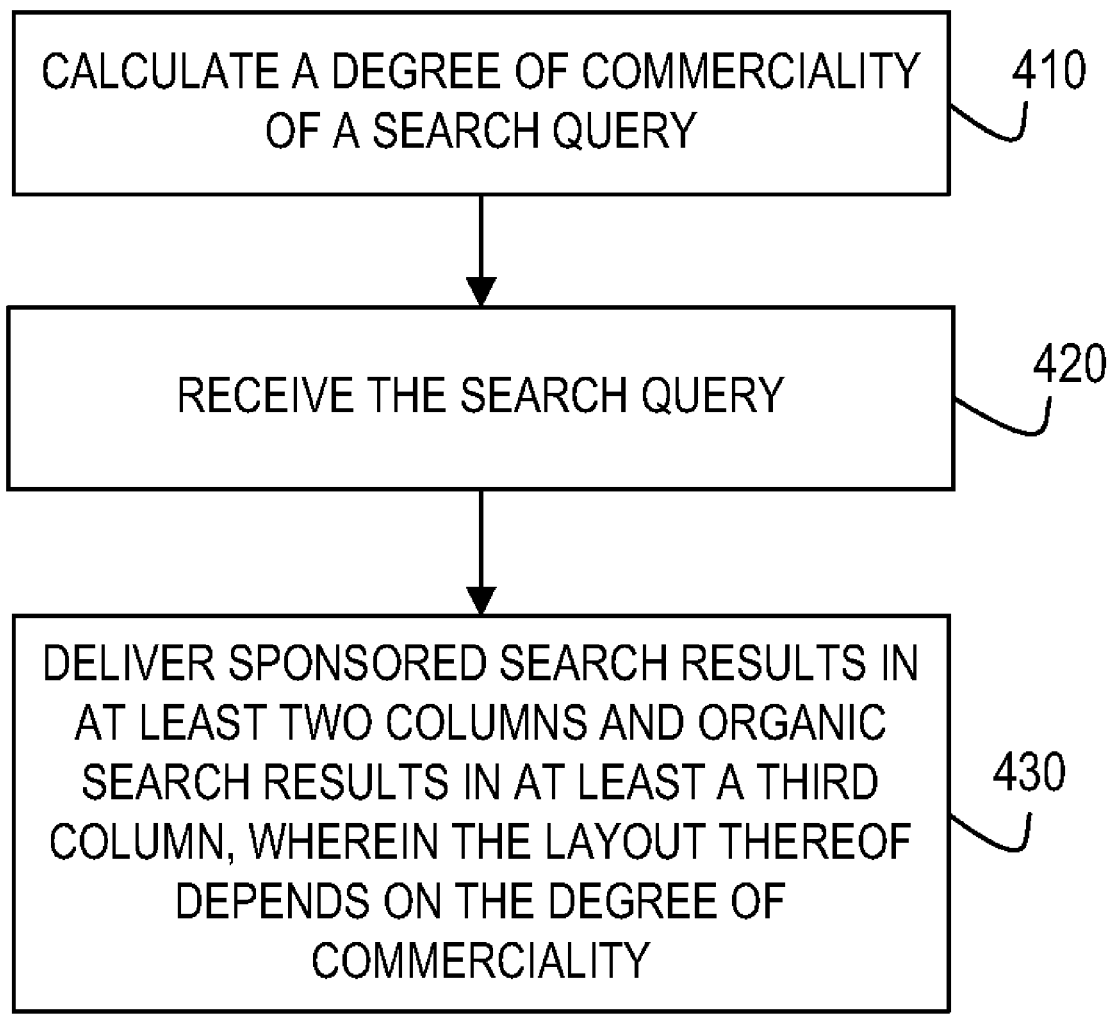
FIG. 4 is a flow diagram of a method for optimizing the delivery of sponsored search results, alongside organic search results, in additional columns depending on a level of commerciality of a search query.

FIG. 4 is a flow diagram of a method for optimizing delivery of sponsored search results, alongside organic search results, in additional columns depending on a level of commerciality of a search query. At block 410, a search engine 120 calculates a degree of commerciality of the search query. At block 420, the search engine receives the search query from a user. At block 430, the search engine 120 delivers a plurality of sponsored search results in at least two columns and a plurality of organic search results in at least a third column of one or more search results pages, wherein a layout of the at least three columns depends on the degree of commerciality of the search query. The layout may be one chosen from those illustrated by FIGS. 3A-3D.

Figure 5:
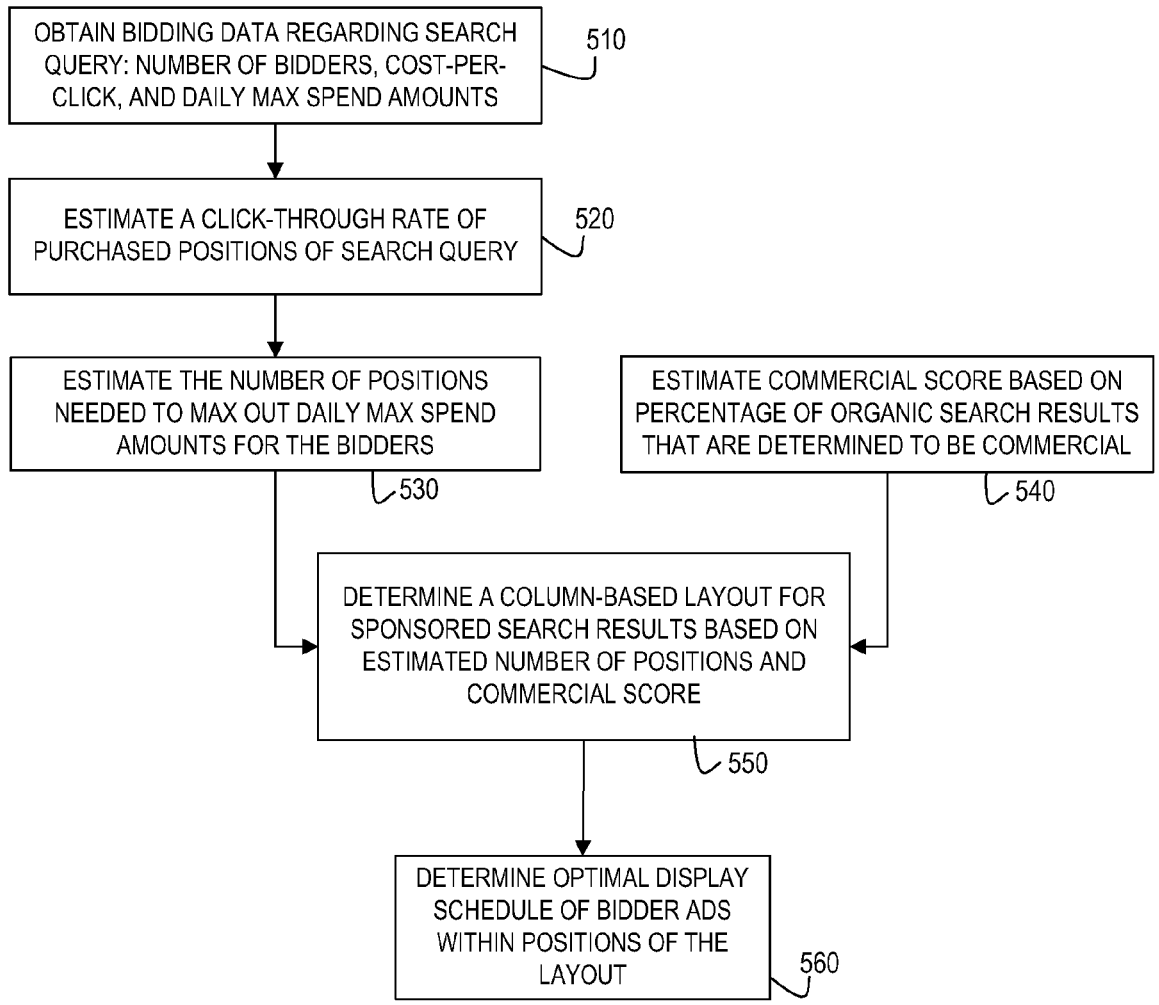
FIG. 5 is a flow diagram of a method for optimizing the relative positions of sponsored and organic search results on a search results page displayed to a user.

FIG. 5 is a flow diagram of a method for optimizing the relative positions of sponsored and organic search results on a search results page displayed to a user. The commercial score may denote a level of commerciality of the combined terms of the search query. This method is yet another embodiment from the example explained with reference to FIG. 2.

The method includes two parallel parts of the estimation. Part one estimates from the sponsored list to determine how many positions are needed. Part two estimates from the organic list to determine how many of the first-listed organic results are actually commercial.

At block 510, the search engine 120 obtains bidding data related to a search query, including a number of bidders for the search query, their price-per-click (PPC) bid amounts, and a daily maximum spending amount for the bidders. At block 520, the search engine estimates a projected click-through-rate (CTR) for each possible sponsored search result position to be filled in response to the search query during a next time period based on the bidding data. The next time period may be the next day. In the alternative, the estimate may be of the CTR of each bidder on each possible sponsored search result position bid on by the bidders. At block 530, the search engine 120 estimates a number of sponsored search result positions required during the next time period in order to meet the daily maximum spending amount of each bidder, based on the number of bidders and the average CTR for each position. At block 540, the search engine 120 estimates a commercial score based on a percentage of first-listed organic search results returned in response to the search query that have a landing page in common with that of a sponsored search result. The first-listed organic search results include at least the organic search results listed on a first page of one or more search results pages delivered in response to the search query.

At block 550, the search engine 120 determines a layout of a determined number of result columns, such as those illustrated by FIGS. 3A-3D, to which to deliver the sponsored search results on the one or more search results pages based on the estimated number of positions and the commercial score. The determination of the layout may further be based on one or more of: (i) an average number of daily searchers; (ii) the number of bidders; (iii) an average bid PPC; and (iv) a total daily budget for the bidders. At block 560, the search engine 120 determines an optimized display schedule for displaying advertisements of the bidders in each position of the estimated number of sponsored search result positions to optimally meet the maximum daily spend amount of the bidders.

Figure 6:
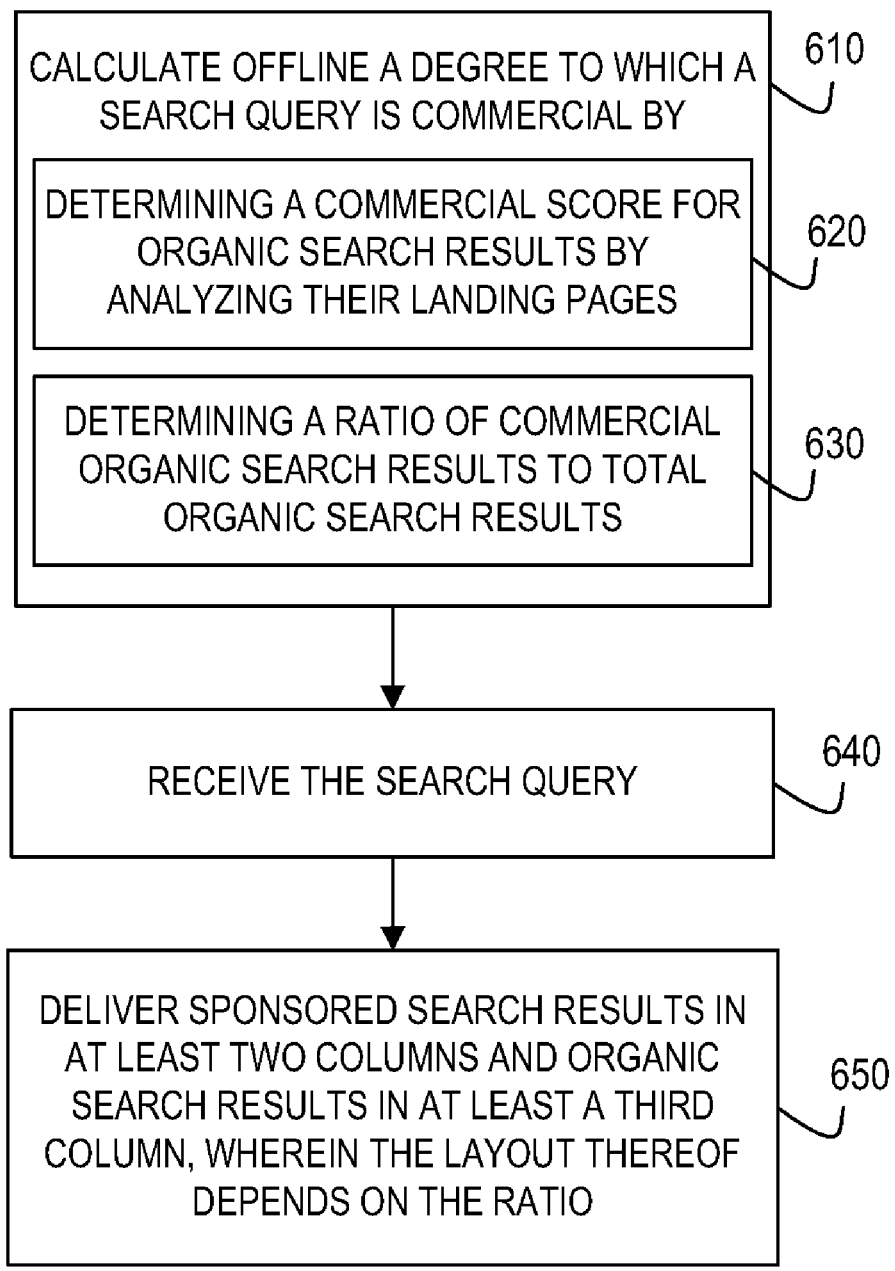
FIG. 6 is a flow diagram of another method for optimizing the delivery of sponsored search results, alongside organic search results, in additional columns depending on a level of commerciality of a search query.

FIG. 6 is a flow diagram of another method for optimizing delivery of sponsored search results, alongside organic search results, in additional columns depending on a level of commerciality of a search query. At block 610, the search engine 120 calculates, offline, a degree to which a search query is commercial including, at block 620, determining a commercial score for each of at least some of a plurality of organic search results returned in response to the search query by analyzing a landing page associated with each organic search result for commercially-related content, and at block 630, determining a ratio of commercial organic search results to total organic search results returned in response to the search query.

At block 640, the search engine 120 receives the search query from a user. At block 650, the search engine 120 delivers a plurality of sponsored search results in at least two columns and a plurality of organic search results in at least a third column of one or more search results pages, wherein a layout of the at least three columns depends on the ratio. The layout may one chosen from those illustrated by FIGS. 3A-3D.

The system and process described may be encoded in a signal bearing medium, a computer readable medium such as a memory, programmed within a device such as one or more integrated circuits, one or more processors or processed by a controller or a computer. If the methods are performed by software, the software may reside in a memory resident to or interfaced to a storage device, synchronizer, a communication interface, or non-volatile or volatile memory in communication with a transmitter. A circuit or electronic device may be designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A computer-implemented method for optimizing the relative positions of sponsored and organic search results on a search results page displayed to a user, the method comprising:
    calculating, by a search engine, a degree of commerciality of a search query;
    receiving the search query from a user by the search engine; and
    delivering, by the search engine to a browser of a user in response to the search query, a plurality of sponsored search results in at least two columns and a plurality of organic search results in at least a third column of one or more search results pages, wherein a layout of the at least three columns depends on the degree of commerciality of the search query;
    wherein the degree to which the search query is commercial is based on a number of first-listed organic search results of the plurality of organic search results that are commercial, based on an analysis of content of their respective landing pages, wherein the first-listed organic search results comprise at least those listed on a first page of the one or more search results pages.

2. The method of claim 1, wherein a first of the at least two columns is located at the left of the search results pages, the second of the at least two columns is located at the right, and the organic search results are positioned therebetween.

3. The method of claim 2, wherein one of the at least two columns of sponsored search results comprises graphic advertisements including hyperlinks to content provided by a provider of the search engine, or an affiliate thereof.

4. The method of claim 1, wherein the degree of commerciality is based on at least one of a number of advertisers that bid on the search query and a total amount bid by the advertisers on the search query.

5. The method of claim 1, wherein the at least two columns of sponsored search results are positioned to the left of the at least third column of organic search results for the search query in response to at least 50% of the first-listed organic search results being commercial.

6. The method of claim 1, wherein the at least two columns of sponsored search results are positioned at the right of the at least third column of organic search results for the search query in response to less than about 20% of the first-listed organic search results being commercial.

7. A computer-implemented method for optimizing the relative positions of sponsored and organic search results on a search results page displayed to a user, the method comprising:
    obtaining bidding data related to a search query by a search engine having a processor and a memory, the data including a number of bidders for the search query, their price-per-click (PPC) bid amounts, and a daily maximum spending-amount for each bidder;
    estimating, by the search engine, a projected click-through-rate (CTR) for each possible sponsored search result position to be filled in response to the search query during a next time period based on the bidding data;
    estimating, by the search engine, a number of sponsored search result positions required during the next time period in order to meet the daily maximum spending-amount of each bidder, based on the number of bidders and the average CTR for each position;
    estimating a commercial score, by the search engine, based on a percentage of first-listed organic search results returned in response to the search query that have a landing page in common with that of a sponsored search result, wherein the first-listed organic search results comprise at least the organic search results listed on a first page of one or more search results pages delivered in response to the search query; and
    determining, by the search engine, a layout of at least two result columns to both of which to deliver the sponsored search results on the one or more search results pages based on the estimated number of positions and the commercial score.

8. The method of claim 7, further comprising:
    determining whether a landing page of each of the first-listed organic search results is commercial based on an analysis of content of the landing page, wherein estimating the commercial score comprises calculating a percentage of the first-listed organic search results that are commercial based on the analysis of their landing pages.

9. The method of claim 7, further comprising:
determining an optimized display schedule for displaying advertisements of the bidders in each position of the estimated number of sponsored search result positions to optimally meet the maximum daily spend amount of each bidder.

10. The method of claim 7, wherein the layout comprises two left-hand columns of sponsored search results in response to the number of required positions comprises more than twelve and the commercial score comprises at least 50%.

11. The method of claim 7, wherein estimating the CTR at each position includes estimating the CTR of each bidder on each position;
wherein determining a layout of a determined number of result columns of sponsored search results is further based on one or more of: (i) an average number of daily searchers; (ii) the number of bidders; (iii) an average bid PPC; and (iv) a total daily budget for each bidder.

12. A computer-implemented method for optimizing the relative positions of sponsored and organic search results on a search results page displayed to a user, the method comprising:
calculating offline, by a search engine, a degree to which a search query is commercial comprising:
determining a commercial score for each of at least some of a plurality of organic search results returned in response to the search query by analyzing a landing page associated with each organic search result for commercially-related content;
determining a ratio of commercial organic search results to total organic search results based on the commercial scores of the at least some of the plurality of organic search results;
receiving the search query from a user by the search engine; and
delivering, by the search engine to a browser of the user, a plurality of sponsored search results in at least two columns and a plurality of organic search results in at least a third column of one or more search results pages, wherein a layout of the at least three columns depends on the ratio.

13. The method of claim 12, wherein a first of the at least two columns is located at the left of the search results page, the second of the at least two columns is located at the right, and the organic search results are positioned therebetween.

14. The method of claim 12, wherein the commercial score is determined based on a number of the first-listed organic search results that are also included as a sponsored search result, wherein the first-listed organic search results comprise at least those listed on a first page of the search results pages.

15. The method of claim 12, wherein the at least two columns of sponsored search results are positioned to the left of the at least third column of organic search results for the search query if the ratio is at least 50%.

16. The method of claim 12, wherein the at least two columns of sponsored search results are positioned at the right of the at least third column of organic search results for the search query if the ratio is below 20%.

17. A search engine for optimizing relative positions of sponsored and organic search results on a search results page displayed to a user, comprising:
a processor and a memory coupled with the processor;
a database including organic and sponsored search results, the database coupled with the processor;
a communication interface, coupled with the processor and the database, to receive the query from a user and to deliver one or more search results pages to a browser of the user in response to the query;
a commercial engine, coupled with the processor and the database, to calculate a degree to which the search query is commercial and to save the calculated degree in the database; and
a delivery manager, coupled with the processor, the database, and the communication interface, the delivery manager to receive the query from the communications interface and to direct the communications interface to deliver a plurality of sponsored search results in at least two columns, with the organic search results in at least a third column, of the one or more search results pages in response to the search query, wherein a layout of the at least three columns depends on the degree of commerciality of the search query;
wherein the degree to which the search query is commercial is based on a number of first-listed organic search results in the third column that are commercial, based on an analysis of content of their respective landing pages, wherein the first-listed organic search results comprise at least those listed on a first page of the one or more search results pages.

18. The search engine of claim 17 wherein a first of the at least two columns is located at the left of the search results pages, the second of the at least two columns is located at the right, and the organic search results are positioned therebetween.

19. The search engine of claim 17, wherein the at least two columns of sponsored search results are positioned to the left of the at least third column of organic search results for the search query in response to at least 50% of the first-listed organic search results being commercial, and are positioned at the right of the at least third column of organic search results for the search query in response to less than about 20% of the first-listed organic search results being commercial.

20. The search engine of claim 17, wherein an organic search result is considered commercial if it is also included as a sponsored search result.

21. The search engine of claim 17, wherein the commercial engine determines:
a commercial score for each of at least some of a plurality of organic search results returned in response to the search query by analyzing a landing page associated with each organic search result for commercially-related content; and
a ratio of commercial organic search results to total organic search results based on the commercial scores of the at least some of the plurality of organic search results.

22. The search engine of claim 17, wherein the commercial engine executes its calculations offline before the user submits the search query, the search engine further comprising a bid logs database, wherein the commercial engine:
obtains, from the bid logs database, bidding data related to a search query, including a number of bidders for the search query, their price-per-click (PPC) bid amounts, and a daily maximum spending amount for the bidders;
estimates a projected click-through-rate (CTR) for each possible sponsored search result position to be filled in response to the search query during a next time period based on the bidding data;
estimates a number of sponsored search result positions required during the next time period in order to meet the daily maximum spending amount of each bidder, based on the number of bidders and the average CTR for each position;

estimates a commercial score based on a percentage of first-listed organic search results returned in response to the search query that have a landing page in common with that of a sponsored search result, wherein the first-listed organic search results comprise at least the organic search results listed on a first page of the one or more search results pages delivered in response to the search query; and determines the layout on the one or more search results pages based on the estimated number of positions and the commercial score.

23. The search engine of claim 22, wherein the commercial engine determines an optimized display schedule for displaying advertisements of the bidders in each position of the estimated number of sponsored search result positions to optimally meet the maximum daily spend amount of the bidders.

24. The search engine of claim 22, wherein estimating the CTR at each position includes estimating the CTR of each bidder on each position;
    wherein determining a layout of a determined number of result columns of sponsored search results is further based on one or more of: (i) an average number of daily searchers; (ii) the number of bidders; (iii) an average bid PPC; and (iv) a total daily budget for the bidders.

\* \* \* \* \*